Dec. 15, 1964    P. P. LOVE    3,161,446
BEARING PADS
Filed Jan. 14, 1963

INVENTOR
PHIL P. LOVE
BY

ATTORNEY

United States Patent Office 3,161,446
Patented Dec. 15, 1964

3,161,446
BEARING PADS
Phil Prince Love, Wembley, England, assignor to The Glacier Metal Company Limited, Wembley, England, a company of Great Britain
Filed Jan. 14, 1963, Ser. No. 251,289
Claims priority, application Great Britain, Jan. 19, 1962, 2,114/62
9 Claims. (Cl. 308—160)

This invention relates to thrust or journal bearing pads and has for one object to decrease the frictional drag of such a pad without substantially decreasing the load-carrying capacity.

The contours of equal lubricant pressures over such a bearing pad do not conform with the shape of conventional bearing pads, particularly at the corners. The load-carrying capacity varies directly with the lubricant film pressure so that areas of low film pressure contribute little to the total load-carrying capacity. The frictional drag is approximately independent of film pressure and is directly proportional to the bearing area of the pad. Conventional journal bearing pads have bearing surfaces which are part-cylindrical in shape, being defined by four sides meeting approximately at right angles, and conventional thrust bearing pad surfaces are in the shape of sectors of an annular ring and are also defined by four sides meeting approximately at right angles. The equal-lubricant-pressure contours are more nearly circular or oval than the shape of these pad surfaces, and accordingly the present invention may be defined as a thrust or journal bearing pad, the shape of whose bearing surface conforms approximately with the shape of a selected equal-lubricant-pressure contour in the lubricant between the co-operating bearing surface and a conventional pad whose area is 30 to 50% greater than that enclosed by the selected equal-lubricant-pressure contour. Thus the shape may accord with one of the shapes shown in the accompanying drawings. From another aspect it may be considered that the corners of a conventional pad are removed.

In particular, the shape of the thrust-bearing surface of a thrust pad may be defined by two opposed radial sides and two opposed concentrical circular arcuate sides, the meeting sides of which are joined by arcs of smaller radius. Similarly, the shape of the load-bearing surface of a journal pad may be defined between two opposed sides parallel with the journal axis and two opposed circular arcuate sides in planes not parallel with the journal axis, the meeting sides of which are joined by arcs of smaller radius.

In either case, if rotation in one direction only is required, the arcs at one side may be of smaller radius than the arcs at the other side; the smaller radius arcs will be at the sides which are to be the trailing edges of the pads.

The invention may be carried into practice in various ways and two embodiments will now be described by way of example with reference to the accompanying drawings, of which:

Figure 1:
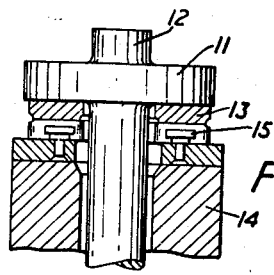
FIGURE 1 shows a general arrangement of a thrust bearing employing pads embodying the invention.

The bearing shown in FIGURE 1 employs a thrust flange 11 on a shaft 12 which co-operates with a number of thrust pads 13 individually supported on a base 14 through locating means such as pins 15. The precise method of mounting the pads 13 in any particular bearing will depend upon the characteristics of that bearing and many different constructions are well known.

Figure 2:
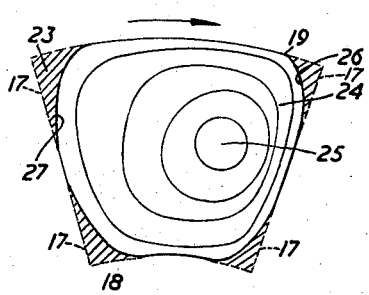
FIGURE 2 shows the shape of a thrust pad embodying the invention.
Figure 3:
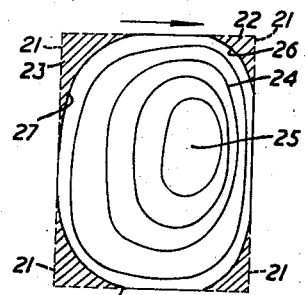
FIGURE 3 shows the shape of a journal pad embodying the invention.

FIGURES 2 and 3 show the outline of conventional bearing pads, the shapes of whose bearing surfaces are defined respectively by two radial lines 17 and two circular arcs 18 and 19 centered on the thrust axis on the one hand and by two lines 21 parallel with the journal axis and two circular arcs 22 in planes transverse to the journal axis on the other hand. The arrows show the directions in which a shaft moves in relation to the bearing pads so that in each case the leading edge of the pad is the edge 17 or 21 at the left hand side of the figure.

It has now been appreciated that where the adjacent sides of these pads join each other at right angles, there are portions 23 of the bearing pad (shown shaded) which contribute little to the load-carrying capacity but are responsible for a substantial proportion of the frictional drag. This last feature can be appreciated by considering the equal-lubricant pressure contours shown in the drawings such as at 24 as complete rings roughly centered on a point 25 midway through the bearing pad dimension which is perpendicular to the direction of rotation, but rather nearer the trailing edge than the leading edge.

Accordingly the present invention proposes to reduce the frictional drag without greatly reducing the load-carrying capacity by removing the corners 23 shown shaded, so that the shape of the bearing surface corresponds more nearly to the shape of the equal-pressure contours 24.

In fact once the corners have been removed, the lubricant pressure at the edge will in any case tend to fall to conform with the new pad shape, but the pad shape corresponds more nearly to the shape of what would be an equal pressure contour in a conventional bearing pad, that is one without the corners removed, of perhaps 30 to 50% greater area.

The actual contours in a particular pad could be measured by experimental exploration or could be calculated, for example, by the mathematical relaxation method or by the method described by Sternlicht in Paper 21 of the Proceedings of the Conference of Lubrication and Wear organised by the Institution of Mechanical Engineers, London, 1957. It will be seen that in general the lines 26 separating the parts to be removed at the trailing edge from the rest of the pad will be arcs of smaller radius than the lines 27 at the leading edge.

However where the bearing is required for rotation in either sense, the shape of the bearing surface will preferably by symmetrical, and a compromise shape may be approximated to merely by removing the corners from a conventional pad along arcs of a substantial radius, or possibly along straight lines inclined to both adjacent sides of the pad.

Bearings embodying the invention have the additional advantages that the removal of the corners of the pad leaves a larger area of collar or shaft exposed to the wash of the cooling oil, so that heat can be removed more quickly from the bearing, and, where the corners are removed along curves, that the curved shape of the pad assists the circulation of the oil by providing a better flow path.

It has been stated above that any conventional method of securing the pads may be used. What is more, the pads may be of the tilting or rigid type or they may be tapered land pads, stepped pads, or Rayleigh pads, or even pocketed hydro-static pads.

What I claim as my invention and desire to secure by Letters Patent is:

1. A thrust bearing pad, the shape of whose bearing surface conforms with the shape of an equal-lubricant-pressure contour for a thrust pad whose shape is defined between inner and outer concentric circular arcs, and two radial sides joining corresponding ends of the arcs, and whose area is between 30% and 50% greater than the area enclosed by the equal-lubricant-pressure contour.

2. A journal bearing pad, the shape of whose bearing surface conforms with the shape of an equal-lubricant-pressure contour for a journal pad whose shape is defined between two straight lines parallel with the journal axis and two circular arcs centered on the journal axis joining the corresponding ends of the straight lines, and whose area is between 30% and 50% greater than the area enclosed by the equal-lubricant-pressure contour.

3. A thrust pad the shape of whose thrust bearing surface is defined by two opposed radial sides having straight portions and two circumferential sides each joining corresponding ends of the radial sides, the corners where the sides join being curved to leave straight portions of the radial sides which are shorter in length than half the maximum radial dimension of the pad.

4. A thrust pad as claimed in claim 3 in which the corners at one radial side are of smaller radius than the arcs at the other radial side.

5. A journal pad defined between two opposed sides parallel with the journal axis and two opposed circular arcuate sides in planes transverse to the journal axis, the meeting sides of which are joined by arcs of smaller radius.

6. A journal pad as claimed in claim 5 in which the arcs at one parallel side are of smaller radius than the arcs at the other parallel side.

7. A bearing pad, the shape of whose bearing surface conforms with an equal-lubricant-pressure contour of the pad.

8. A thrust bearing comprising a number of bearing pads as claimed in claim 1 arranged around the bearing axis in an annular ring, means supporting each pad.

9. A journal bearing comprising a number of bearing pads as claimed in claim 2, arranged around the bearing axis with their bearing surfaces on a cylinder centre on the bearing axis, and means supporting each pad.

References Cited by the Examiner
UNITED STATES PATENTS
1,207,071  12/16  Parsons _____ 308—160

FOREIGN PATENTS
714,650  9/54  Great Britain.
72,494  6/53  Netherlands.

FRANK SUSKO, *Primary Examiner.*